March 11, 1969     R. PFOERTNER     3,431,961
ELASTOMERIC TRACTION LINK ELEMENT
Filed June 2, 1966
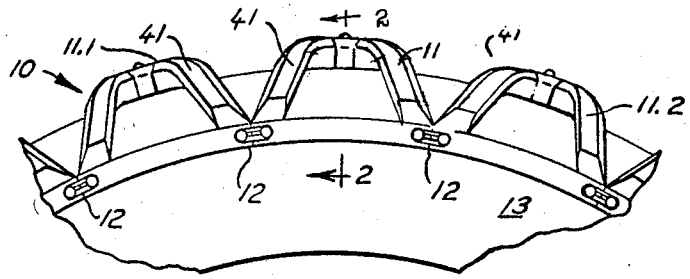
*Fig. 1*
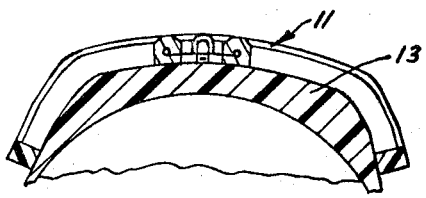
*Fig. 2*
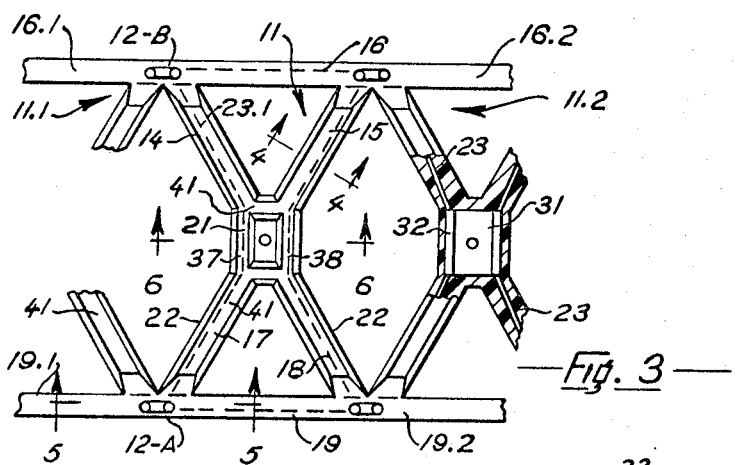
*Fig. 3*
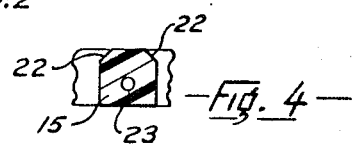
*Fig. 4*
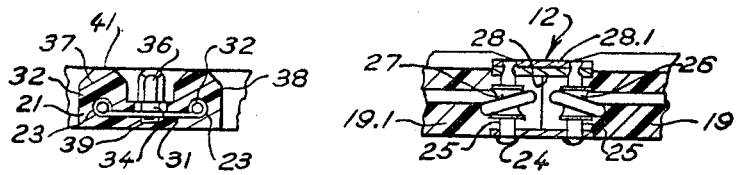
*Fig. 6*     *Fig. 5*
Rolf Pfoertner,
Inventor
By 
Agent 3,431,961
Patented Mar. 11, 1969

3,431,961
ELASTOMERIC TRACTION LINK ELEMENT
Rolf Pfoertner, 2176 E. 28th Ave., Vancouver,
British Columbia, Canada
Filed June 2, 1966, Ser. No. 555,649
U.S. Cl. 152—222
Int. Cl. B60c 27/00
7 Claims

ABSTRACT OF THE DISCLOSURE

An elastomeric traction link element of integral construction, a generally X-shaped configuration with bars at open ends of the X forming two open triangles joined at their apices in a central member. A continuous cable extending in a generally hour-glass configuration through all members of the triangles, and releasable securing means so that a required number of links may be joined together in end-to-end relation to provide a traction device for an automobile tire.

BACKGROUND OF THE INVENTION

This invention relates to a traction link element, a plurality of which is assembled to constitute a traction device to be applied over and circumferentially surrounding a tire of an automotive vehicle.

Conventional tire chains have been used for many years for improved traction, and are known to be effective for this purpose. However tire chains wear out relatively quickly, tend to damage road surfaces, are noisy, can be dangerous when they break, provide a rough ride, and have other well known disadvantages. Many devices of merit have been invented which have been successful in reducing the disadvantages above whilst retaining adequate traction.

The present invention is a traction link adapted to be assembled as aforesaid, and mounted on a tire of an automotive vehicle. Particularly, as many links as necessary can be readily assembled in end-to-end relationship to provide a traction device assembly of such size as may be required to fit the tire.

The link is an integral construction of a suitable tough elastomer. Elastomers of suitable physical properties are well known in the art and form no part of my invention, therefore are not herein specified in detail. With links of such a material, the noise and rough ride associated with conventional chains are materially reduced.

A problem encountered in known traction devices of this general kind is that the links are required to be able to withstand rough usage, and accordingly traction devices have been made with reinforcement such as lacings, metal and other inserts, and have been reinforced in other ways. The present link has imbedded reinforcement provided in such a manner that the link is at least as strong in tension, and as able to resist repeated bending, as the reinforcement itself.

OUTLINE OF THE INVENTION

According to the present invention, there is provided an elastomeric traction link element of integral construction, the link having a generally X-shaped configuration. The link has a first triangular element defined by transverse bars and a cross bar, and a second triangular element defined by further transverse bars and a further base bar. Apices of the triangular elements are adjoined in a central integral intersection member, with the transverse bars substantially aligned—thus forming the generally X-shaped configuration. The reinforcement is a continuous cable extending through each bar of each triangular element aforesaid in a configuration later particularized, which configuration I designate hereinafter and in the claims, as "generally hour-glass," a waist of the hour-glass being defined at the central member. Releasable fastening means are provided at outer ends of the base bars so that individual links may be assembled to one another in end-to-end relationship to provide a traction device of required length. It will be understood that the assembly will have free ends, which ends can be joined when placing the assembly on a tire.

This is best accomplished on a hoist, or with a wheel jacked, and the tire partially deflated. When the traction device has been so mounted on the tire, inflation will strain the assembly to snug fit, to become effectively a part of the tire. It will be appreciated that such installation is semi-permanent to remain, once fitted, through the winter for removal in the spring, since the ride is as smooth and quiet as, and the traction generally better than, common snow tires.

To ensure adequately tight fit, there can obviously be provided auxiliary links of smaller—or greater—length so that, regardless of nominal tire size and tread outside diameter, proper fit is readily achieved.

DESCRIPTION OF THE DRAWINGS

FIGURE 1 is a fragmented side elevation of an assembly of traction links according to the invention, shown in position on a tire of an automotive vehicle.

FIGURE 2 is a section on 2—2 of FIGURE 1, with some elements not shown in section.

FIGURE 3 is a plan view showing a link assembled to adjoining links with the latter fragmented and, part of one adjoining link broken away showing attachment of a cable to a central plate, the links being spread out flat.

FIGURE 4 is a detail section on 4—4 of FIGURE 3.

FIGURE 5 is a detail section on 5—5 of FIGURE 3, with the cable and some fastener parts not shown in section.

FIGURE 6 is a detail section on 6—6 of FIGURE 3.

A detail description following, related to the drawings, describes an example of a preferred embodiment of the invention which, however, is capable of expression in structure other than that which is particularly described and illustrated.

DETAIL DESCRIPTION

Description of FIGURES 1 and 2

A traction tread device assembly according to the present invention is designated generally by the numeral 10. The assembly has a plurality of individual traction link elements 11 each assembly being releasably secured to an adjoining assembly by means designated 12 in FIGURE 1, a link 11 being so joined to adjoining links 11.1 and 11.2. Each link extends around an outer periphery of a tire 13, the total number of links required is typically about twenty, depending upon the size of the tire and the dimensions of the individual links. The assembly of joined links constitutes the traction device, applied to a tire of an automotive vehicle circumferentially surrounding the tire.

Description of FIGURE 3

In FIGURE 3, the adjoining links 11, 11.1, 11.2, of FIGURE 1 are shown spread out flat. It is seen that each link element is a generally X-shaped configuration with bars closing open ends of the X. A first open triangular element is thus defined by transverse bars 14, 15, and a base bar 16; and a second triangular element by transverse bars 17, 18, and a base bar 19. The transverse bars are aligned as shown, with adjacent apices of the triangular portions joined in a central intersection member 21. All of the bars and the central member are integral, being of a tough elastomer.

Description of FIGURES 4, 5, 6

The transverse bars are generally rectangular in section as seen in FIGURE 4. Outer corners can be bevelled as seen at 22. A cable is imbedded in the transverse member 15 as indicated at 23, the cable extending continuously through all of the bars as is later described.

The releasable connecting means 12 has an inner connecting plate 24 with spaced parallel pins 25 secured adjacent the ends thereof as seen. Bushings 26 and 27 are imbedded within the base members 19 and 19.1 near adjoining ends thereof. To attach the base bar 19 to the base bar 19.1, the spaced parallel pins 25 are pushed through the imbedded bushings. A removable outer plate 28 is then placed in position as shown, with outer ends of the pins 25 extending through openings thereof, and being secured by common slotted snap fastener means 28.1 as shown. The plates, pins, and snap fastener, with the pins passing through the bushings, thus comprise releasable fastening means securing the links to one another in end-to-end relationship.

In an assembly of traction links, individual locking means are disposed opposite to one another, for instance as seen at 12-A and 12-B, FIGURE 3. In an assembly at least one pair of locking means, for instance 12-A and 12-B must be releasable, e.g. as above described, in order that the assembly may be placed on the tire.

Description of FIGURE 6 and further reference to FIGURE 5

A central plate 31 is imbedded in the central intersection member 21 as seen in section in FIGURE 6. Outer side edges of the center plate are rolled inwards to define spaced hollow passages 32 through which the cable 23 passes. A nut 34 secured to the plate is also imbedded in the central member 24. A threaded shank of an ice stud 36 can thus be screwed into the nut, so securing the ice stud in a central position and extending outwards of the member 21.

Reinforcing cable

In FIGURE 3 a central part of the link element 11.2 appears partly broken away to show the cable 23 extending through the passages 32 of the center plate 31 of the traction element 11.2.

The cable configuration above is of a generally hour-glass shape with a waist of the hour-glass being defined by the spaced cable passages 32.

The continuous cable 23 is disposed as follows in each link, a broken line 23.1 designating its position in the link 11. The cable passing through one passage 32 (FIGURE 6) of the central plate extends generally centrally within the bar 17, is wrapped once around the bushing 26 (FIGURE 5), extends centrally through the base bar 19, around the bushing at its outer end, centrally through the bar 18, through the second passage 32 (FIGURE 6), through the bar 15, around the bushing at the right hand end of the base bar 16 to the bushing at the left end of this bar, then centrally through the bar 14, back to the one passage 32 aforesaid—and can be crimped therein. Each link has a continuous imbedded cable in hour-glass configuration as described, so that junctions of the integral elastomer members to one another have at least strength equal to that of the cable.

From FIGURE 6 it is seen that the bars 14 and 17, and the bars 15 and 18, are not aligned, and extend to blend into spaced raised parts 37 and 38 of the central member 21 so as to be substantially continuous, with the said raised portions 37 and 38 joined by a web 39 of the central intersections. In FIGURE 1, outer surfaces of the bars forming the individual traction elements are designated 41, which outer surfaces are also designated 41 in FIGURE 3. In the spread out position FIGURE 3 these outer surfaces suitably are co-planar.

INSTALLATION AND OPERATION

As many individual traction link elements as required, say about twenty, are assembled with the base bars 16 and 19 in end-to-end relation as seen in FIGURE 3. Each link is now secured to the adjoining link as previously explained with reference to FIGURE 5, or can obviously be secured by riveting the outer plate 28 in position. A traction device assembly as FIGURE 3 and having a requisite number of links is mounted on a tire preferably with the vehicle on a hoist and the tires partially deflated. In this way, the adjoining ends can readily be fastened. Now, when the tires are inflated, the assembly is strained to snug secure fit, becoming effectively a part of the tire. Special auxiliary links of smaller peripheral length can obviously be provided—ensuring adequately snug fit regardless of nominal tire size, or tread wear.

When ice studs are required, these can be attached either before putting the traction device on the wheel, or afterwards. It is seen that the ice studs have hex heads and that, because of the spacing between the raised members 37, 38, FIGURE 6, they can readily be attached, tightened, and removed as desired, with the use of a common socket wrench.

Having described my invention what I claim is:
1. An elastomeric traction link element of integral construction having generally X-shaped configuration, and adapted for a plurality of links to be assembled to one another in end-to-end relationship in a link assembly to be applied over and circumferentially surrounding a tire of an automotive vehicle, to constitute a traction device; each link comprising in combination,
    (a) a first triangular element defined by transverse bars and a base bar,
    (b) a second triangular element defined by further transverse bars and a second base bar,
    (c) apices of the triangular elements being joined in a central intersection member with the transverse bars aligned,
    (d) a continuous cable extending through each bar in a generally hour-glass configuration with a waist of the hour-glass being defined at the central intersection member,
    (e) and releasable fastening means at outer ends of the base bars.
2. Structure as defined in claim 1, and a bushing imbedded in each end bar adjacent outer ends thereof.
3. Structure as defined in claim 2, wherein the releasable fastening means includes,
    (i) an inner connecting plate with spaced parallel pins secured adjacent ends thereof, the pins being adapted to be pushed through the bushings of adjacent end bars of adjoining links of the link assembly,
    (ii) a removable outer plate adapted to be placed with outer ends of the spaced pins extending through openings thereof,
    (iii) and snap fastener means at outer ends of the pins securing the removable outer plate.
4. Structure as defined in claim 3, and a central plate imbedded in the central intersection member, the central plate having first and second spaced passages for the continuous cable, with the waist aforesaid defined by the spaced passages.
5. Structure as defined in claim 4, wherein the cable, extending through the first central plate passage aforesaid, extends generally centrally of a transverse bar of the first triangular element, is wrapped once around one bushing of the base bar, extends generally centrally of the base bar to the remaining bushing thereof being wrapped once around that bushing, extends generally centrally of the remaining transverse bar of the first triangular element, through the second passage of the central plate, thence similarly through the bars and around the bushings of the second triangular element to extend within the first central plate passage aforesaid.

6. Structure as defined in claim 2; a central plate imbedded in the central intersection member, the central plate having first and second spaced passages for the continuous cable, with the waist aforesaid defined by the spaced passages, and wherein the cable, extending through the first central plate passage aforesaid, extends generally centrally of a transverse bar of the first triangular element, being wrapped once around one bushing of the base bar, extends generally centrally of the base bar to the remaining bushing thereof being wrapped once around that bushing, extends generally centrally of the remaining transverse bar of the first triangular element, through the second passage of the central plate, thence similarly around the bushings of the second triangular element to extend within the first central plate passage aforesaid; and an ice stud adapted to be removably secured in the central plate.

7. Structure as defined in claim 5; the unaligned transverse bars extending through the central intersection member being spaced by a web thereof, the central plate being imbedded in the web, an ice stud adapted to be removably secured in the central plate and being disposed between the spaced transverse bars.

References Cited

UNITED STATES PATENTS

| | | | |
|---|---|---|---|
| 1,830,556 | 11/1931 | Nelson | 152—222 |
| 2,341,317 | 2/1944 | Faulds | 152—222 |
| 3,092,163 | 6/1963 | Bunker et al. | 152—221 |

ARTHUR L. LA POINT, *Primary Examiner.*